June 30, 1970  O. B. ECCHER  3,517,528
CONSTANT VELOCITY UNIVERSAL JOINT
Filed June 4, 1968  3 Sheets-Sheet 2
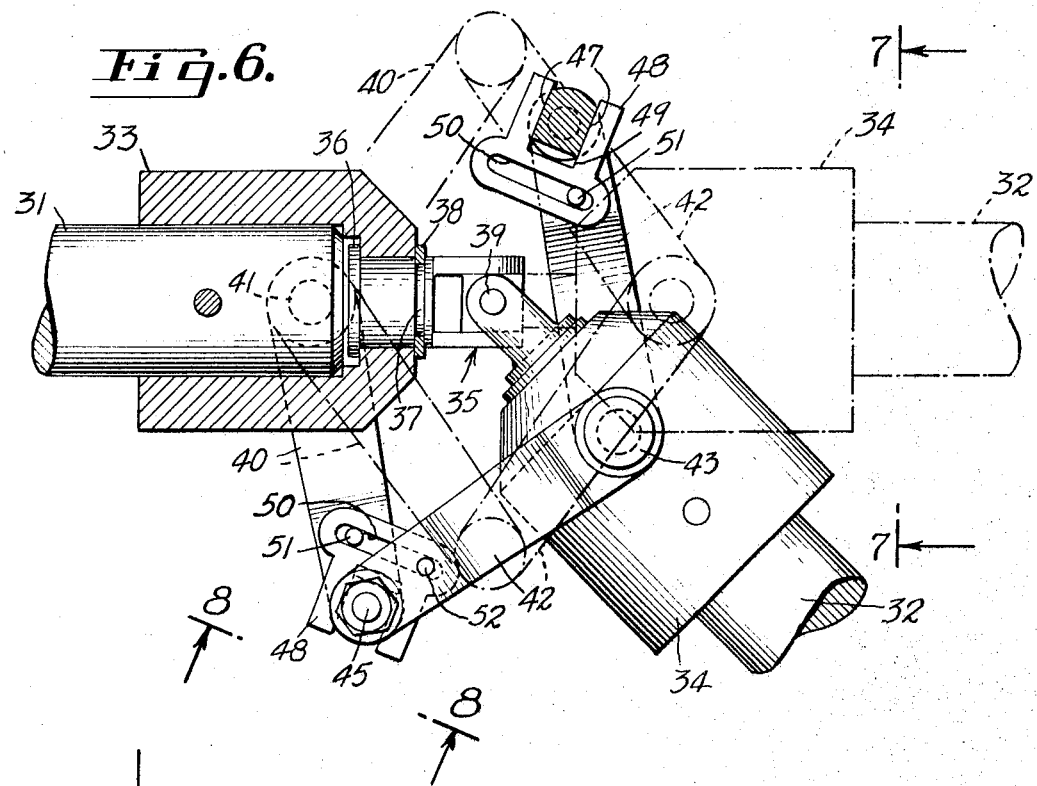
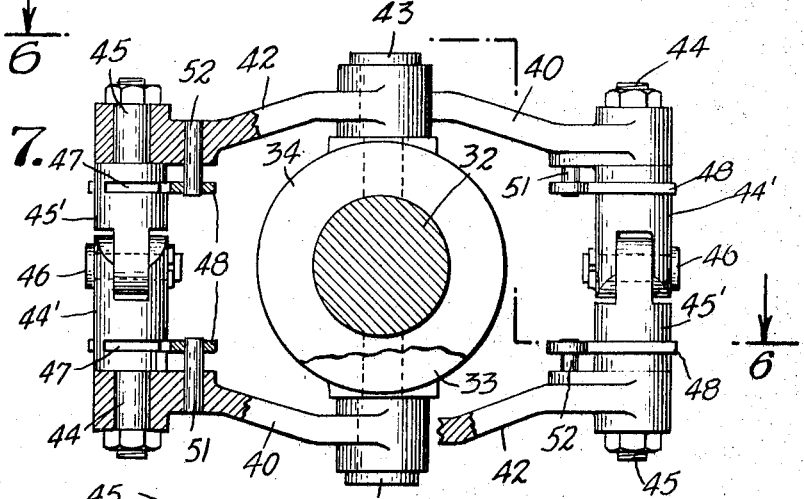
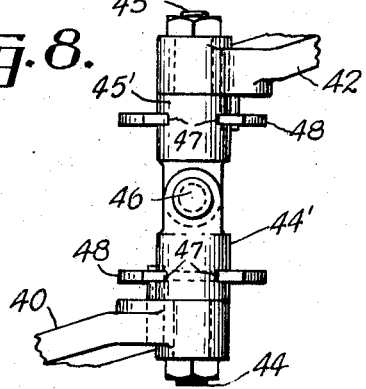
INVENTOR.
ORESTE B. ECCHER
BY
Howard L. Thompson
ATTORNEY June 30, 1970    O. B. ECCHER    3,517,528
CONSTANT VELOCITY UNIVERSAL JOINT
Filed June 4, 1968    3 Sheets-Sheet 3
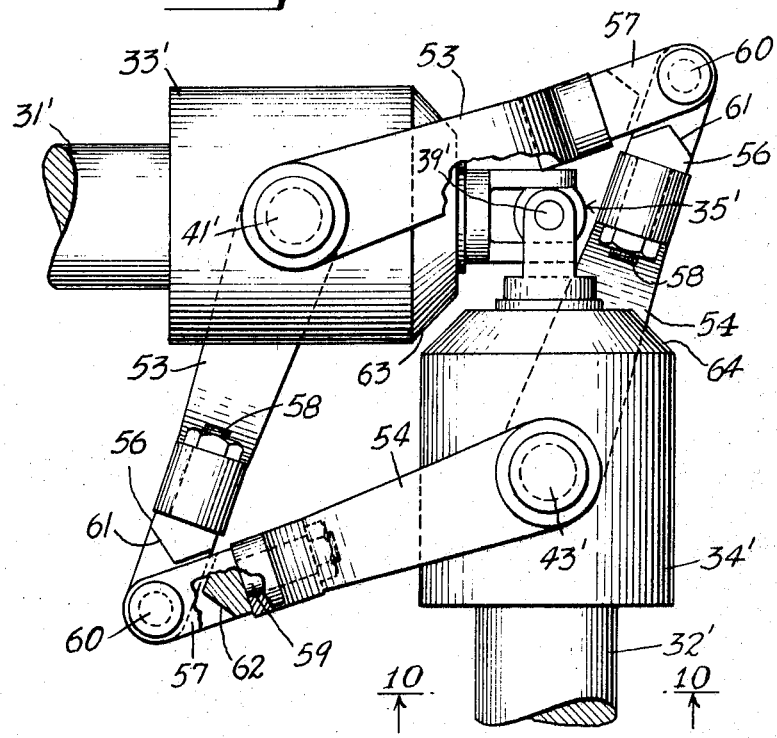
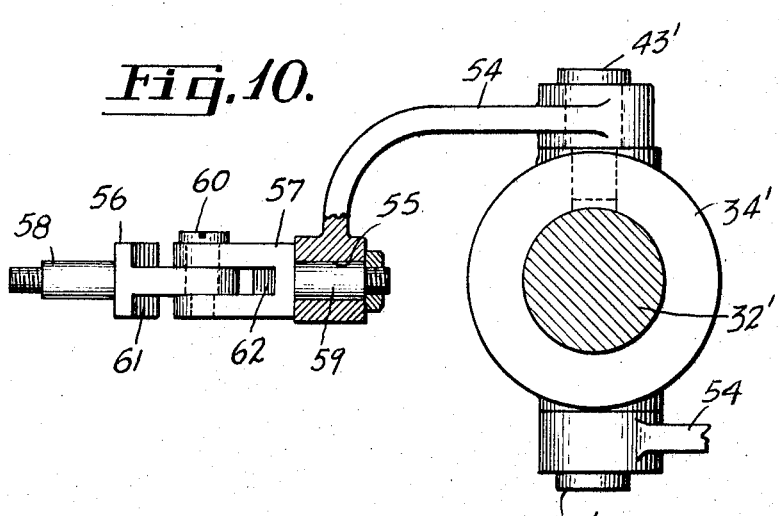
INVENTOR.
ORESTE B. ECCHER
BY
Howard E. Thompson
ATTORNEY

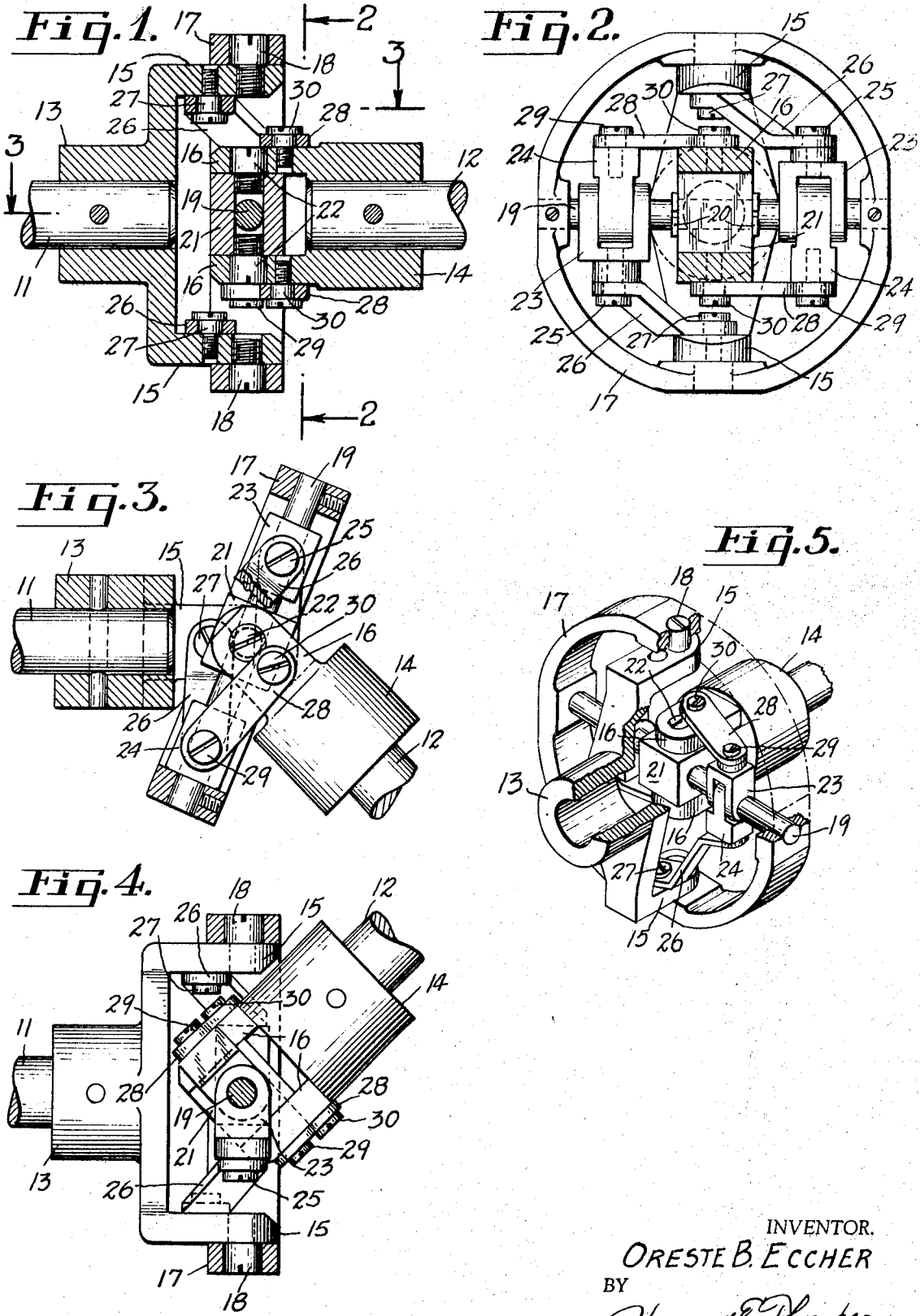

United States Patent Office 3,517,528
Patented June 30, 1970

3,517,528
CONSTANT VELOCITY UNIVERSAL JOINT
Oreste B. Eccher, 1 Sherman St.,
Brooklyn, N.Y. 11215
Filed June 4, 1968, Ser. No. 734,396
Int. Cl. F16d 3/30
U.S. Cl. 64—21                                8 Claims

ABSTRACT OF THE DISCLOSURE

A coupling mechanism comprising a constant velocity universal joint which is self-positioning and free from endwise axial motion for all transmission angles within its range and, particularly, to couplings of this class which transmit uniform motion; i.e., the rotation of one shaft is exactly duplicated by the other shaft. Still further, the coupling mechanism can be dynamically balanced for high speed operation and operate through transmission angles in excess of transmission angles possible in ball and socket joints.

---

Another object of the invention is to provide a universal joint which is inexpensive, easy to manufacture and service, dimensionally smaller and lighter in weight.

The novel features of the invention will be best understood from the following description, when taken together with the accompanying drawings, in which certain embodiments of the invention are disclosed and, in which, the separate parts are designated by suitable reference characters in each of the views and, in which:

FIG. 1 is a sectional view through a joint, with parts of the construction shown in elevation and illustrating the shafts in alinement.

FIG. 2 is a sectional view substantially on the line 2—2 of FIG. 1 showing, for the most part, the joint in elevation.

FIG. 3 is a diagrammatic sectional view on the broken line 3—3 of FIG. 1, illustrating the shafts in angular position one with respect to the other and with other parts in different position.

FIG. 4 is a side elevation, generally similar to FIG. 1, indicating the shafts in angular position with respect to each other and with parts of the construction shown in section.

FIG. 5 is a diagrammatic isometric view, omitting parts and with parts of the construction broken away and in section, the joint being in the position generally as illustrated in FIGS. 1 and 2.

FIG. 6 is a diagrammatic plan and sectional view of a modified form of joint, with the shafts in angular position with respect to each other and indicating in dot-dash lines the shafts in common alinement, the linkage being shown only in outline position in dot-dash lines.

FIG. 7 is a sectional view on the line 7—7 of FIG. 6 showing the joint in the dot-dash position of FIG. 6 and with parts of the construction broken away and in section.

FIG. 8 is a partial detail view looking generally in the direction of the lines 8—8 of FIG. 6.

FIG. 9 is a plan view of a modified form of joint, showing the shafts in a different position from that seen in FIG. 6 and with parts of the construction broken away; and FIG. 10 is a section on the line 10—10 of FIG. 9, diagrammatically showing mounting of one of the links and with the coupling part of an associated link in extended position.

Considering FIGS. 1 to 5, inclusive, the shafts to be universally coupled are shown at 11 and 12, one shaft being a drive shaft and the other being the driven shaft. Fixed to the shafts are sleeves or hubs 13 and 14, the hubs having pin supporting portions, defined by forks 15 and 16. A universal coupling between the shafts 11 and 12 is provided by an intermediate ring member 17 articulated in one plane about pins 18 fixed to the forks 15.

Coplanar with the axis of the pins 18, the ring member 17 carries a pin 19. The axis of pins 18 may be said to be perpendicular to the axis of the pin 19. Centrally located on the pin 19 and retained in this position by snap rings 20, FIG. 2, is a block 21 fashioned to fit between the forks 16 of hub 14 and pivotally attached to hub 14 by pins 22, note FIG. 1.

The shaft 12 can be articulated in one plane about the axis of pins 22 and in planes perpendicular to this plane about the axis of pin 19. It will be apparent that the axis of pins 18, 19 and 22 intersect at a common point and, therefore, no endwise motion can be imparted to the shafts by articulating the shafts in any plane or conical path within the range of the coupling.

As best seen in FIG. 2, the pin 19 also carries two pairs of clevis-type slide blocks, each pair being composed of two parts 23 and 24 which can be reciprocated in unison along the axis of pin 19 and pivotally flexed about the transverse plane, as will be apparent from a consideration of FIGS. 2, 3 and 4. The parts 23 are pivotally connected by pins 25 to one end of offset links 26. The other end of the links are pivotally connected by pins 27 to forks 15. Similarly, straight links 28 are pivotally connected at one end to the parts 24 by pins 29. The other end of the links 28 are pivotally connected to the forks 16 by pins 30. It will be apparent that the spacing between the pivot ends of links 26 and 28 is the same.

At this time, it is pointed out that, while two pairs of links and parts 23, 24 are disclosed, the mechanism would be fully operative even if only one pair of links and parts were employed. The addition of the second set produces a partial balacing effect in operation of the mechanism. The mechanism is also flexible in design. For example, the links 26 and 28 can be designed to function only as positioning means for the pin 19 and transmit no torque, or they can be designed to function both as positioning means and torque transmitting means. To illustrate the value of this feature, it may be preferable, for example, in the smaller units, to employ lightweight links; whereas, torque transmitting links may reduce the size of the coupling in the larger high torque units.

In operation of the mechanism shown in FIGS. 1 to 5, inclusive, the axis of the fork pins 18 rotate in a plane perpendicular to the axis of the shaft 11 and the axis of the fork pins 22 rotate in a plane perpendicular to the axis of the shaft 12. While the axis of pin 19 in the intermediate ring member 17 is constrained by the action of levers or links 26 and 28 and the slide blocks defined by the pairs of parts 23 and 24 to rotate in the bisecting or median plane between the aforementioned planes, it will be apparent that all necessary conditions for transmission of uniform motion have been met by the mechanism illustrated and described.

In FIGS. 6, 7 and 8 is shown a modified form of mechanism and, considering FIG. 6, shafts 31 and 32 are provided with similar hub portions 33 and 34. In this embodiment, the members 33, 34 are held together, so that the axis of the shafts 31 and 32 intersect at the same point for all transmission angles by a universal joint 35. Each part of the joint 35 is the same and has at one end a shoulder 36 and an annular groove 37, the groove being engaged by a snap ring 38. The body of the yoke parts of the joint 35 are thus provided with an axially restrained rotatable mounting in the bores of the hubs 33, 34. The point of intersection of the two shafts is defined by the connection of the axis of the two mutually perpendicular coupling pins in the center block of the joint 35, one only of these pins being shown at 39. This coupling is the same as the intersection of the axis of the pins 19 and 22, establishing the point of intersection of the shafts in the embodiment of FIGS. 1 to 5.

Pivotally mounted on the hub 33 are two cranks or pins 40 which articulate about pivot pins 41, which are either pressed or threaded in hub 33. Similarly, two links 42 are articulated about pins 43 carried by hub 34. The other end of links 40, 42 are apertured to pivotally engage the cylindrical portions of pins 44 and 45 of knuckle joints, each joint comprisin gparts 44', 45' which articulate about headed axis pins 46.

To allow the shafts 31, 32 to be moved through different angular positions, and in order to transmit uniform motion, it is necessary to keep the axes of pins 46 colinear in the same median or bisecting plane as the axis of pin 19 in the embodiment of FIGS. 1 to 5. To accomplish this, each part 44', 45' is grooved at 47, note FIG. 8, this groove being engaged by a "Scotch Yoke" plate 48 which, in turn, has a slot 49 fashioned to fit the grooves 47. At right angles to the slot 49, each plate has an elongated slot 50, which is engaged by pins 51 and 52 carried by cranks 40 and 42, respectively. This mechanism is well-known and operates on the principle that the perpendicular to the base of an isosceles triangle bisects the apex angle. It is here to be noted the great similarity of the mechanism of FIGS. 6 to 8 with the structure shown in FIGS. 1 to 5, inclusive.

In FIGS. 9 and 10 of the drawing is shown a slight variation of the structure shown in FIGS. 6 to 8, inclusive, the variation being primarily in the form of the links employed and the arrangement of coupling the links.

As all other structures of the showing in FIGS. 9 and 10 are the same as in FIGS. 6 to 8, like primed references will identify like parts. Mounted on pins 41' of hub 33' and pins 43' of hub 34' are links 53 and 54, respectively. The offset contour of the links is best seen in FIG. 10. This offset or bend is so that the outer bore 55 of each link lies in the plane of the axis of the shafts 31', 32', as seen, for example, in FIG. 10. The bored ends of links 53, 54 are joined by knuckle joints, generally similar to the showing in FIGS. 6 to 8. These joints each comprise parts 56 and 57 having cylindrical portions or pins 58, 59 pivotally mounted in bores 55 of links 53 and 54, respectively. The pairs of parts 56, 57 are joined in an axis pin 60, functionally similar to the axis pin 46 of FIGS. 6 to 8 and 19 of FIGS. 1 to 5.

Providing bevels 61, 62 on parts 56, 57 and further in bevelling adjacent ends of hubs 33', 34', as seen at 63 and 64, FIG. 9, the shafts 31', 32' can be moved into positions at right angles to each other, as seen in FIG. 9. Further, this structure will allow for a more compact joint.

With the structure of FIGS. 9 and 10, the axis of pins 60 is in the same plane as the axis of the pins 46 of the showing in FIGS. 6 to 8, but are rotated 90° in this plane (the median plane), so that the pins 60 are parallel rather than collinear. Obviously, in this structure, the pins 60 are self-positioning, since, for all angular positions of the shafts, the axis of pins 60 passes through the apex of an isosceles triangle and perpendicular to the plane of this triangle. Therefore, the median or bisecting plane which is also perpendicular to the plane of the triangle and also passes through this point will contain the axis of pins 60. The advantages of the showings in FIGS. 6 to 8 and 9 and 10 over the showing in FIGS. 1 to 5, inclusive, reside in the fact that they allow the shafts to operate at transmission angles in excess of 90°. However, the structure of FIGS. 1 to 5, while limited to smaller transmission angles, will allow articulation of the shafts without affecting the rotary motion of the shafts.

For purposes of description, the universal pivot coupling between the links in the various showings may be said to operate in a coplanar alinement with respect to the universal locating means defining the point of intersection of the drive and driven shafts within the range of operation of the coupling.

Having fully described my invention, what I claim as new and desire to secure by Letters Patent is:

1. A constant velocity universal coupling between a drive shaft and a driven shaft, said coupling having universal locating means defining the point of intersection of said shafts, intermediate universal drive means coupled with said shafts, said last named means comprising a plurality of paired links, all of said links being of identical structure, the links in each pair having mounting ends and free ends, said mounting ends being pivotally secured to said drive shaft and driven shaft at diametrically opposed portions thereof through cylindrical bearings the axes of which are perpendicular to and intersect the axes of said shafts, the free ends of the links in each pair having coplanar cylindrical bearings and being connected through a knuckle joint mounted in said bearings and having a cylindrical pivot axis disposed perpendicularly to the plane of said cylindrical bearings, and said links maintaining constant velocity universal drive between said shafts in various angular positions of the shafts one with respect to the other within the range of said coupling.

2. A coupling as defined in claim 1 wherein said links have curved portions between the mounting and free ends thereof.

3. A coupling as defined in claim 1 wherein components of the coupling are shaped to permit transmission of rotation of the drive shaft to said driven shaft while the driven shaft is oriented in any position within a wide angle cone coaxial with said drive shaft.

4. A coupling as defined in claim 1 wherein components of the coupling are shaped to permit transmission of rotation of the drive shaft to said driven shaft while the driven shaft is oriented in any position within a hemisphere disposed perpendicularly to the axis of said drive shaft.

5. A coupling as defined in claim 1 wherein said coplanar cylindrical bearings have axes parallel to the pivot axes of the respective links with said shafts.

6. A coupling as defined in claim 1 wherein said coplanar cylindrical bearings have axes parallel to the pivot axes of the respective links with said shafts, and means is employed at each side of each knuckle joint operatively engaging the associated link in maintaining alignment of said links.

7. A coupling as defined in claim 1 wherein said coplanar cylindrical bearings have axes perpendicular to the pivot axes of the respective links with said shafts and intersecting the axis of the associated shaft.

8. A coupling as defined in claim 1 wherein said universal locating means comprises a universal joint rotatably and coaxially mounted in said shafts.

References Cited

UNITED STATES PATENTS

| 898,423 | 9/1908 | Bartlett | 64—17 X |
|---|---|---|---|
| 1,058,878 | 4/1913 | Lowndes | 64—18 X |
| 2,206,291 | 7/1940 | Nelson | 64—21 |
| 2,864,246 | 12/1958 | Hulse | 64—21 |
| 2,902,843 | 9/1959 | Forbes | 64—21 X |
| 125,881 | 4/1872 | Clemens | 64—21 |

FOREIGN PATENTS

| 787,925 | 7/1935 | France. |
| 884,129 | 4/1943 | France. |
| 56,061 | 6/1952 | France. |

JAMES A. WONG, Primary Examiner